(12) United States Patent
Jactat

(10) Patent No.: US 11,856,401 B2
(45) Date of Patent: Dec. 26, 2023

(54) IAB SECURITY

(71) Applicant: JRD COMMUNICATION (SHENZHEN) LTD., Guangdong (CN)

(72) Inventor: Caroline Jactat, Nanterre (FR)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 220 days.

(21) Appl. No.: 17/424,627

(22) PCT Filed: Feb. 12, 2020

(86) PCT No.: PCT/CN2020/074837
§ 371 (c)(1),
(2) Date: Jul. 21, 2021

(87) PCT Pub. No.: WO2020/164506
PCT Pub. Date: Aug. 20, 2020

(65) Prior Publication Data
US 2022/0124502 A1     Apr. 21, 2022

Related U.S. Application Data

(60) Provisional application No. 62/805,754, filed on Feb. 14, 2019.

(51) Int. Cl.
*H04W 12/106* (2021.01)
*H04L 9/32* (2006.01)
*H04W 84/04* (2009.01)

(52) U.S. Cl.
CPC ........ *H04W 12/106* (2021.01); *H04L 9/3242* (2013.01); *H04W 84/047* (2013.01)

(58) Field of Classification Search
CPC .. H04W 12/106; H04W 84/047; H04L 9/3242
See application file for complete search history.

(56) References Cited

U.S. PATENT DOCUMENTS

| | | | |
|---|---|---|---|
| 9,456,381 B2 | 9/2016 | Yi et al. | |
| 10,855,814 B2* | 12/2020 | Park | H04W 72/0453 |
| 11,418,952 B2* | 8/2022 | Teyeb | H04W 12/106 |
| 2018/0049190 A1 | 2/2018 | Abedini et al. | |
| 2019/0159277 A1* | 5/2019 | Zhu | H04L 45/16 |
| 2019/0182875 A1* | 6/2019 | Talebi Fard | H04W 8/18 |
| 2020/0029384 A1 | 1/2020 | Hong et al. | |
| 2020/0084618 A1* | 3/2020 | Teyeb | H04W 80/02 |
| 2020/0084688 A1* | 3/2020 | Mildh | H04W 88/08 |

FOREIGN PATENT DOCUMENTS

| | | | |
|---|---|---|---|
| CN | 103 188 681 A | 7/2013 | |
| CN | 110475267 A * | 11/2019 | ............ H04W 24/02 |
| WO | 2018/182286 A1 | 10/2018 | |

OTHER PUBLICATIONS

"Security framework for the NR integrated access backhaul", Samsung, 3GPP TSG-SA WG3 Meeting #94, S3-190357, 2019.
(Continued)

*Primary Examiner* — Techane Gergiso
(74) *Attorney, Agent, or Firm* — PV IP PC; Wei Te Chung; Zhigang Ma

(57) ABSTRACT

Methods for applying hop-by-hop security in IAB networks. Integrity protection is applied at a layer below the IP layer for each link in a transmission route. Integrity is verified at the receiving node of each link of a route through an IAB network and if that verification fails the received traffic is discarded.

21 Claims, 12 Drawing Sheets

(56) References Cited

OTHER PUBLICATIONS

"LS on IAB security", 3GPP RAN2, 3GPP TSG SA WG3 (Security) Meeting #93, S3-183706, 2018.
"Distributed RRC functions for IAB", Huawei, 3GPP TSG-RAN WG2#103, R2-1812830, Aug. 2018.
"Consideration on QoS impacts", LG Electronics Inc., 3GPP TSG-RAN WG2 NR AH#4, R2-1810676, Jul. 2018.
Maughan, et al., "Internet Security Association and Key Management Protocol (ISAKMP)", Network Working Group, RFC 2408, Standards Track, Nov. 1998.
Harkins, et al., "The Internet Key Exchange (IKE)", Network Working Group, RFC 2409, Standards Track, Nov. 1998.
"Digital cellular telecommunications system (Phase 2+); Universal Mobile Telecommunications System (UMTS); LTE; 3G security; Network Domain Security (NDS); IP network layer security", LTE Advanced, ETSI, 3GPP TS 33.210 version 12.2.0, Release 12, 2014.
3GPP TR 38.874, V0.5.0, 3rd Generation Partnership Project; Technical Specification Group Radio Access Network; Study of Integrated Access and Backhaul, Release 15, 2018.
Kent, et al., "Security Architecture for the Internet Protocol", Network Working Group, RFC 2401, Obsoletes 1825, Standards Track, Nov. 1998.
Piper, et al., "The Interent IP Security Domain of Interpretation for ISAKMP", Network Working Group, RFC 2407, Standards Track, Nov. 1998.
LTE; Evolved Universal Terrestrial Radio Access (E-UTRA); Packet Data Convergence Protocol (PDCP) specification; 3GPP TS 36.323 version 14.3.0, Release 14, LTE Advanced, ETSI, 2017.

\* cited by examiner

IAB SECURITY

CROSS-REFERENCE TO RELATED APPLICATIONS

This application is a National Stage of International patent application PCT/CN2020/074837, filed on Feb. 12, 2020, which claims priority to U.S. Provisional Patent Application No. 62/805,754 filed Feb. 14, 2019, the disclosures of which are incorporated by reference in their entireties.

TECHNICAL FIELD

The following disclosure relates to security procedures in an IAB network, and in particular provision of integrity protection below the IP layer.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

The NR protocols are intended to offer options for operating in unlicensed radio bands, to be known as NR-U. When operating in an unlicensed radio band the gNB and UE must compete with other devices for physical medium/resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-6}$ or $10^{-6}$ has been proposed. mMTC services are intended to support a large number of devices over a long life-time with highly energy efficient communication channels, where transmission of data to and from each device occurs sporadically and infrequently. For example, a cell may be expected to support many thousands of devices.

The disclosure below relates to various improvements to cellular wireless communications systems.

SUMMARY

There is provided a method of distributing an integrity protection and verification configuration in an IAB network, the method comprising the step of transmitting an integrity protection and verification configuration from an IAB Donor Node of the IAB network to at least one other node of the IAB network, wherein the configuration includes parameters for integrity protection and verification of traffic between IAB nodes of the IAB network to which the configuration is transmitted, the integrity protection and verification being at a layer below the IP layer.

There is also provided a method of configuring an IAB network for data transmission, the method comprising the steps of at a donor node of the IAB network generating a security configuration for a transmission route between the donor node and an access IAB node, wherein the security configuration is for integrity protection of each link forming the transmission route at a layer below the IP layer, and transmitting relevant parameters of the security configuration to IAB nodes forming the transmission route to enable each IAB node to apply integrity protection on data transmitted by the respective node, or to verify integrity protection on traffic received by the respective node, wherein each IAB node forming the transmission route is configured to discard any received traffic which fails integrity verification.

There is also provided a method of data transmission in an IAB network, the method comprising the steps of at a first IAB node applying integrity protection in accordance with a security configuration at a layer below the IP layer to traffic to be transmitted on a first link of a transmission route through the IAB network; transmitting the integrity-protected traffic over the first link to a second IAB node; receiving traffic at the second IAB node and verifying the integrity protection of the traffic; and if the integrity protection fails verification, discarding the traffic.

There is also provided a method of data transmission in an IAB network, the method comprising the steps of at an interim IAB node receiving traffic from a first IAB node; verifying integrity protection of the traffic according to a security configuration; if the verification fails, discarding the traffic; and if the verification passes, applying integrity protection at a layer below the IP layer and transmitting the traffic to a second IAB node.

The security configuration may be for uplink and/or downlink transmissions between nodes of the transmission route.

The security configuration may be defined per logical channel, per UE, or per bearer.

The security configuration may include at least one of PDU sequence number, logical channel identifier, bearer identity, UE identity, key, direction, PDU.

The security configuration may include at least one of sender IAB node address, route identifier, and IAB node position.

The security configuration may be used to generate a key to apply the integrity protection, or to verify the integrity protection.

A Message Authentication Code may be included with transmitted data after applying integrity protection.

The security configuration may be transmitted to all IAB nodes forming the transmission route.

The security configuration may be transmitted to all IAB nodes in the IAB network.

The integrity protection and verification configuration may be for applying to user traffic.

The integrity protection and verification configuration may be for applying to signalling traffic.

BRIEF DESCRIPTION OF THE DRAWINGS

Details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
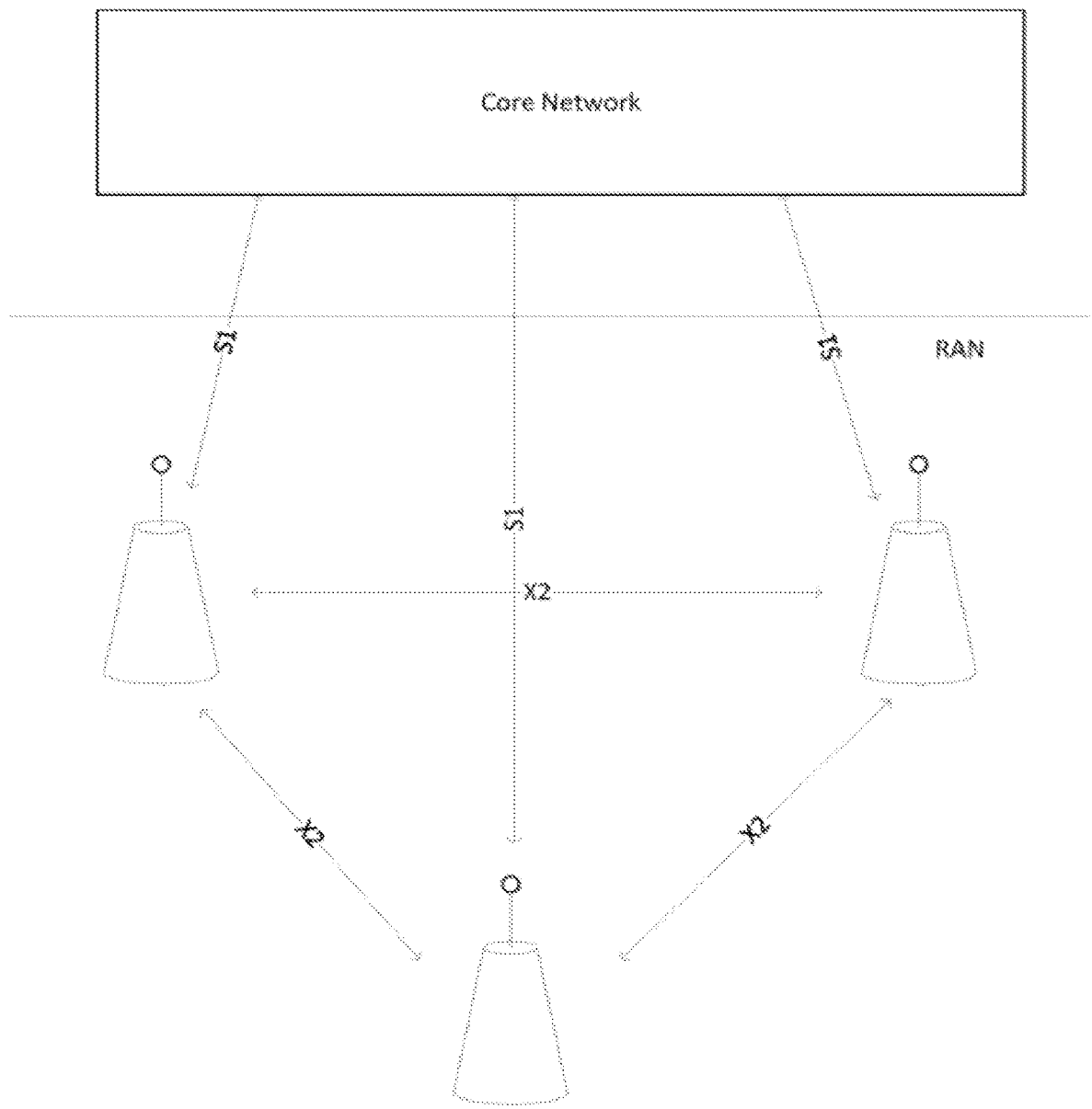
FIG. 1 shows a schematic diagram of selected components of a cellular communications network.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

Figure 2:
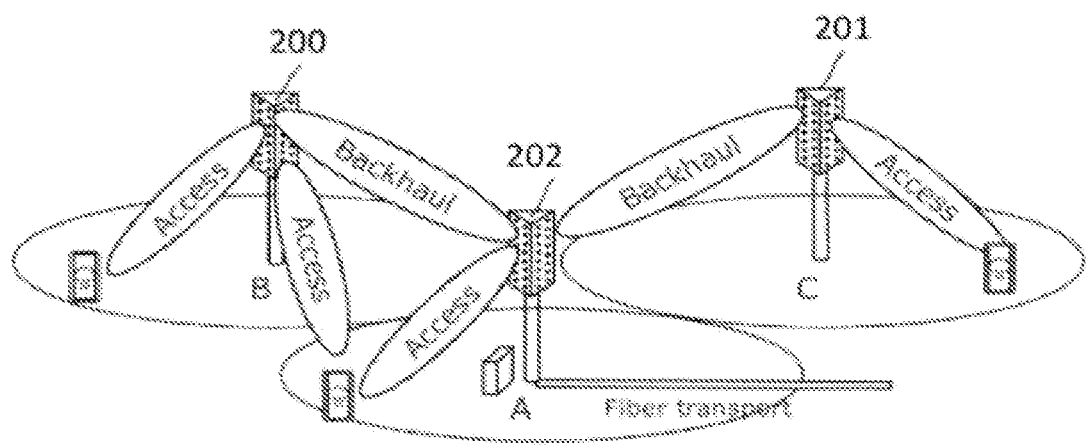
FIG. 2 shows an overview of an IAB network.

Integrated Access Backhaul (IAB) is technology available in NR to allow sharing of wireless resources for both access and backhaul transmissions. As shown in FIG. 2 wireless backhaul links are provided between base stations 200, 201 and base station 202 which has a wired transport connection. Connectivity for UEs is provided from each base station and as appropriate via the wireless backhaul connections.

Figure 3:
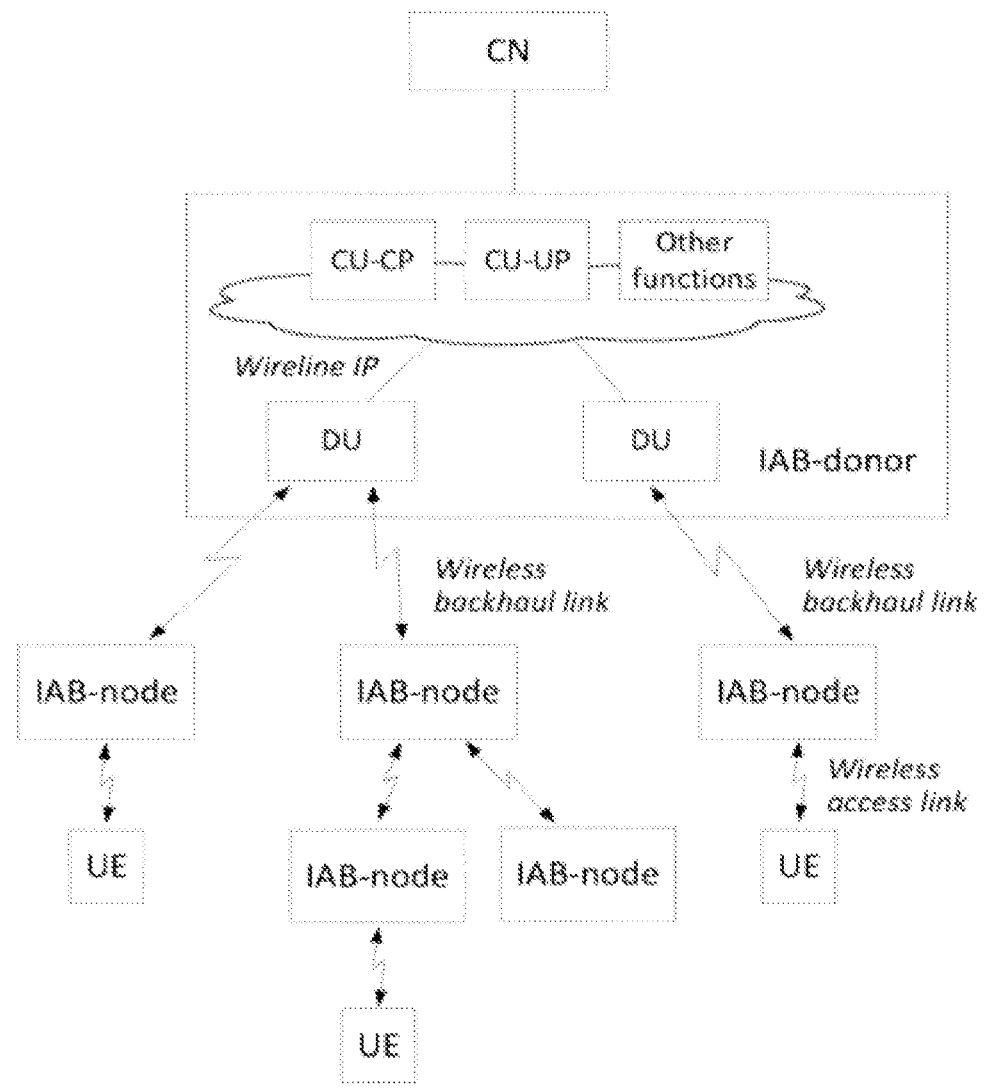
FIG. 3 shows a reference architecture for an IAB network.

FIG. 3 shows a reference diagram for the IAB architecture as per TR 38.874. The IAB-donor is treated as a single logical node that comprises a set of functions such as gNB-DU, gNB-CU-CP, gNB-CU-UP and potentially other functions. In a deployment, the IAB-donor can be split according to these functions, which can all be either collocated or non-collocated as allowed by the NG-RAN architecture. The IAB-nodes between the donor node and the UE are known as relay nodes, and the node to which the UE is connected is the Access Node.

Security comprises the aspects of confidentiality and integrity protection to overcome security threats in the context of introduction of relay nodes between a mobile device (e.g. UE) and a radio network entity (e.g. Donor gNB). One security threat can be attacks on the signalling or data traffic which consists in modifying the traffic over an interface. For user traffic, the data payload or the protocol headers of the communication can be modified. By changing the GTP protocol headers of user traffic over the Un interface between the UE and the RAN, it could be possible to redirect traffic bound from one (victim) UE to another (attacker) UE.

Integrity protection allows a system to detect modification of traffic over an interface. In cellular systems integrity protection is provided by the standards, but its implementation is left to the choice of network operators. For example, it may be acceptable for the user traffic from the UE not to be integrity protected, but not acceptable for signalling traffic from the relay node to the network given the signalling traffic offers the baseline service of registration and connection control to the user. Even when the traffic over an interface is not modified, it can be replayed by an attacker. Replay protection may be provided along with integrity protection.

Two integrity protection schemes exist:

End-to-end (E2E) protection is used to protect a UE's messages between a relay node and the Core Network, transparently from the relay radio node entities. Such protection can be carried out by NDS/IP (IPSec) protocol under TS 33.210 specification.

Hop-by-hop (HBH) protection is used to protect a UE's messages between the relay node and the Core Network that can be carried out by NDS/IP (IPSec) protocol, or between relay nodes that can be carried out by AS (PDCP) protocol under TS 36.323 specification.

Figure 4:
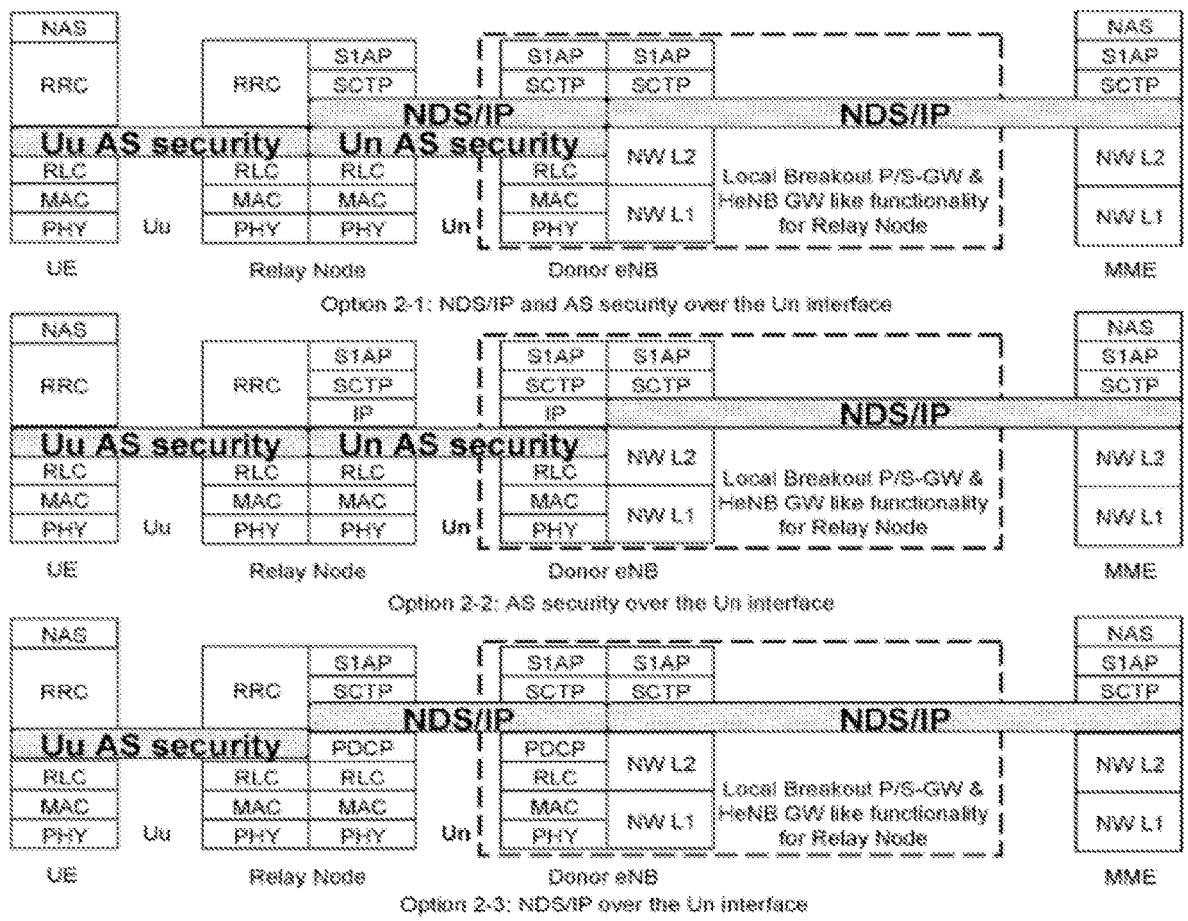
FIGS. 4 & 5 show protocol arrangements for an IAB network.

As background, FIG. 4 shows options for security protection on the Un interface in a one-hop LTE relay node system.

Figure 5:
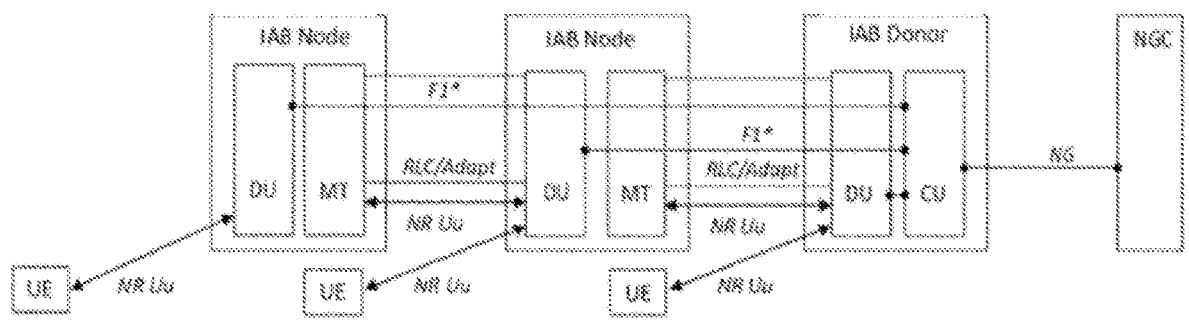

FIG. 5 shows a simplified architecture for multi-hop forwarding in an IAB network which aims to provide reduced latency and using the "RLC/Adapt" adaptation layer.

Since IAB networks comprise a variable number of connections and interfaces there could be added opportunities for security threats. End-to-end integrity protection between Donor and Access IAB node implies that any modification of the traffic in-between the two ends can be detected only when the traffic reaches the other end. Hence, modifications to traffic during relay through a series of IAB relay nodes cannot be detected until the traffic reaches the end. This carriage of modified traffic through the network represents a waste of radio resources which could have been used to transport unmodified traffic instead.

This difficulty may be addressed by hop-by-hop security, but conventional systems have drawbacks in terms of complexity and cost in implementation. NDS/IP (IPSec) protocol requires the implementation of IPSec security associations as specified in RFC-2401 and IKE protocol used for the negotiation of IPSec SAs as specified in RFC-2407, RFC-2408, RFC-2409. PDCP protocol requires the implementation of another protocol (RRC) to set up, activate the security key and then proceed with integrity/verification protection.

In order to overcome the difficulties associated with the prior art but provide integrity protection in an IAB system it is disclosed herein to apply security provisions at a layer below the IP layer. Suitable parameters are provided to each IAB node on a route such that data can be integrity protected for transmission across each link, and the data's integrity verified at the next node. If the data fails an integrity check the data can be discarded and need not be transmitted through the remaining links in the network. Network resources are not therefore wasted transmitting invalid data.

The integrity protection, at a layer below the IP layer, is applied on a hop-by-hop basis at the granularity of a logical channel, a UE, or a bearer. Appropriate identifiers are transmitted from the IAB donor node (which is acting as the gNB for the relevant UE) to each IAB node which needs to apply protection. The sender IAB node for each hop uses these identifiers to generate an integrity key which is used to protect the relevant hop. The protocol for integrity protection e.g. NDS/IP, PDCP can be configured.

Each IAB node needs the sender IAB node's address to generate the integrity key for data received at the IAB node from the sender node. This enables detection if the received data is from an intruder node, rather than the correct sender node.

A route (between Donor and access IAB node) identifier and IAB node position in the route may be used as input parameters to generate integrity keys at IAB nodes.

PDU sequence number, Logical channel identifier (and/or Bearer identifier) or UE identifier, Key, Direction and PDU may used as input parameters to the integrity protection and verification algorithm. The use of these parameters allows an IAB node to uniquely identify a PDU on a logical channel. It is therefore possible detect both tampering attacks and replay attacks where a PDU is retransmitted by an intruder.

Set out below are a number of examples of aspects of a security system for IAB networks. Each example uses an exemplary IAB network comprising an IAB donor and two IAB nodes. An IAB access node provides a wireless connection to the UE concerned, and uses a wireless link via an IAB interim (relay) node for backhaul to the IAB donor. This network is used as an example only and as will be appreciated a principle of IAB networks is that they can be expanded through a plurality of interim (relay) nodes. The same principles discussed in relation to these examples are applicable in any IAB network.

In the example network one Route and three Logical Channels are utilised. The Route is defined between the IAB Access Node and the IAB Donor node, and is labelled 2-0. A first logical channel, 1-0, forms part of the Route between the Interim IAB Node and the IAB Donor Node. A second Logical Channel, 2-1, forms the other part of the Route between the IAB Access Node and Interim IAB Node. The third Logical Channel, 2-0, runs for the length of the route between the IAB Access Node and IAB Donor Node.

Where the examples refer to deriving a key, or a Key Derivation Function (KDF) this may be implemented according to, for example, the techniques disclosed in TS 33.220.

Figure 6:
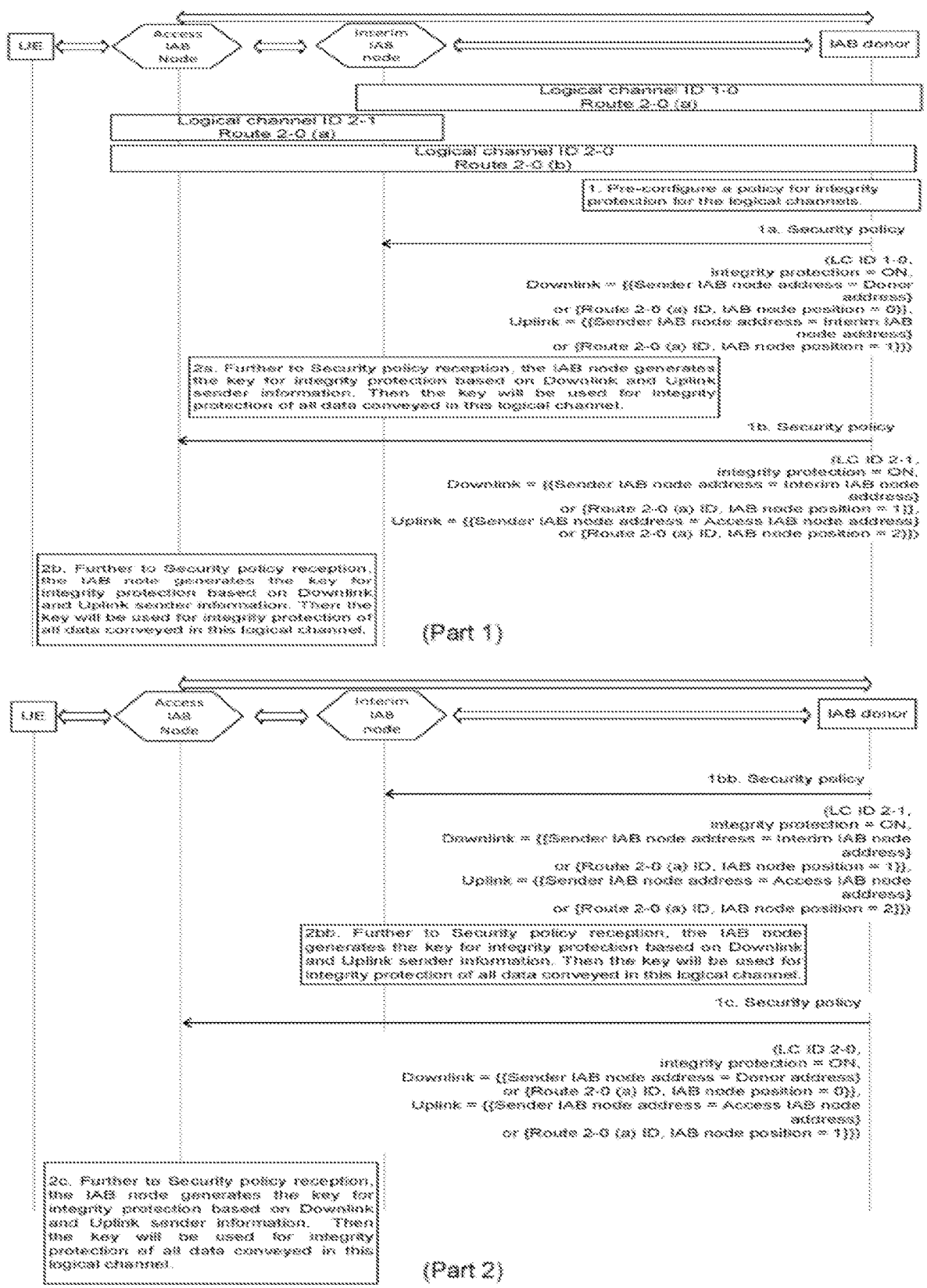
FIG. 6 shows a method of distributing a security configuration based on logical channels in an IAB network.

FIG. 6 shows a configuration process for multi-hop integrity protection based on Logical Channels. At step 1 the IAB Donor Node defines a security policy to implement for relevant logical channels. At step 1a relevant details of that security policy are transmitted to the Interim IAB Node. Those details include the Logical Channel ID (LCID), 1-0, an indication to activate integrity protection, and details for uplink and downlink communications. For downlink communications on LCID 1-0 the Sender IAB Node address is identified as the address of the IAB Donor Node, and for uplink communications on LCID 1-0 the Sender IAB node address is the Interim IAB Node address. These parameters allow the sender address to be used to check integrity, or generate the integrity key, respectively. In an alternative approach, the Route ID and IAB node position for the sender IAB Node on uplink and downlink may be transmitted and utilised to uniquely identify the sender on LCID 1-0.

Upon receipt of the security policy in message 1a, the interim IAB node applies that policy and generates the required keys based on the parameters received. The keys may be generated upon receipt of the policy, or could be generated later, for example when they are first required or at some other convenient time.

The IAB donor node also generates and transmits security policies to the Interim IAB Node and Access IAB node for the other Logical Channels. As shown in FIG. 6, details for LCID 2-1 are sent to both the IAB Access Node and IAB Interim Node as each of those nodes acts as a sender and receiver over that Logical Channel. Each node thus receives the security policy for the logical links on which it acts as sender or receiver and can thus apply and verify integrity protection on those links. Hop-by-Hop integrity protection can thus be applied from the IAB Access Node to the IAB Donor Node and in the opposite direction.

Figure 7:
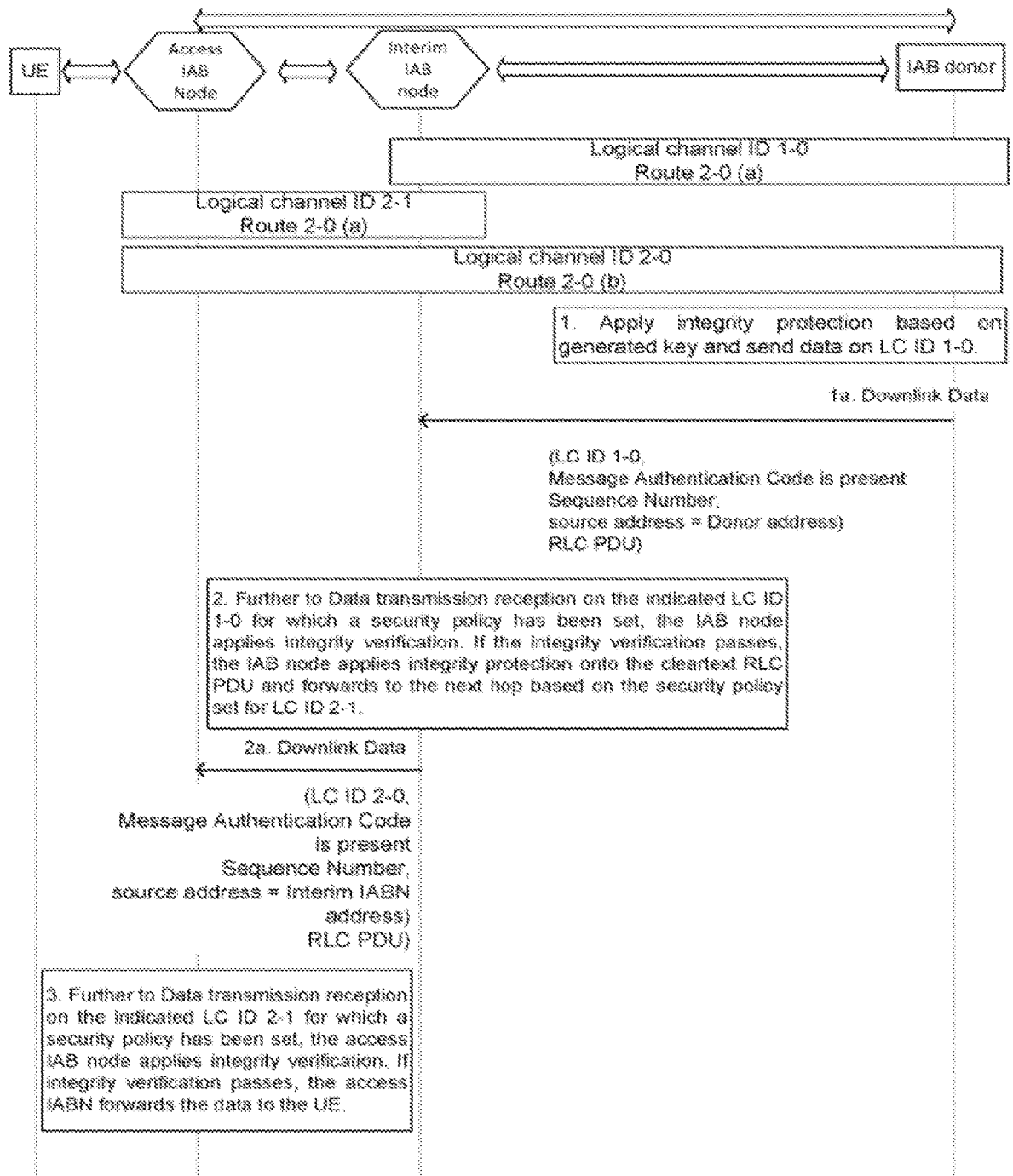
FIG. 7 shows a method of downlink integrity protection in an IAB network based on logical channels.

FIG. 7 shows an example of applying integrity protection to downlink data transmission.

At step 1/1a integrity protection is applied to data for transmission on Route 2-0 and the data is transmitted over the first logical link of that route LCID 1-0. The integrity protection is applied in accordance with the keys generated for LCID 1-0, as explained in relation to FIG. 6.

Upon receipt of the data from the IAB Donor Node, with integrity protection, the IAB Interim Node verifies the integrity of the data utilising the parameters previous received for LCID 1-0 and/or the integrity verification key derived from those parameters. If the integrity is verified the IAB Interim Node applies integrity protection to the data (that is, the cleartext data) for transmission to the IAB Access node on LCID 2-1 according to the policy and parameters previously received for that LCID. The data is then transmitted at step 2a to the IAB Access Node. If the integrity cannot be verified, the data may be discarded. The failure may be indicated to the IAB donor node, or to another element of the cellular network, as this could be important information to indicate the network is being attacked.

Upon receipt of the data the IAB Access Node verifies integrity as described above using the parameters and/or keys for LCID 2-1. The data may then be transmitted to the next element in the Route (in this case the UE), or discarded as described above.

Hop-by-hop integrity verification is thus applied along each step of the route.

Figure 8:
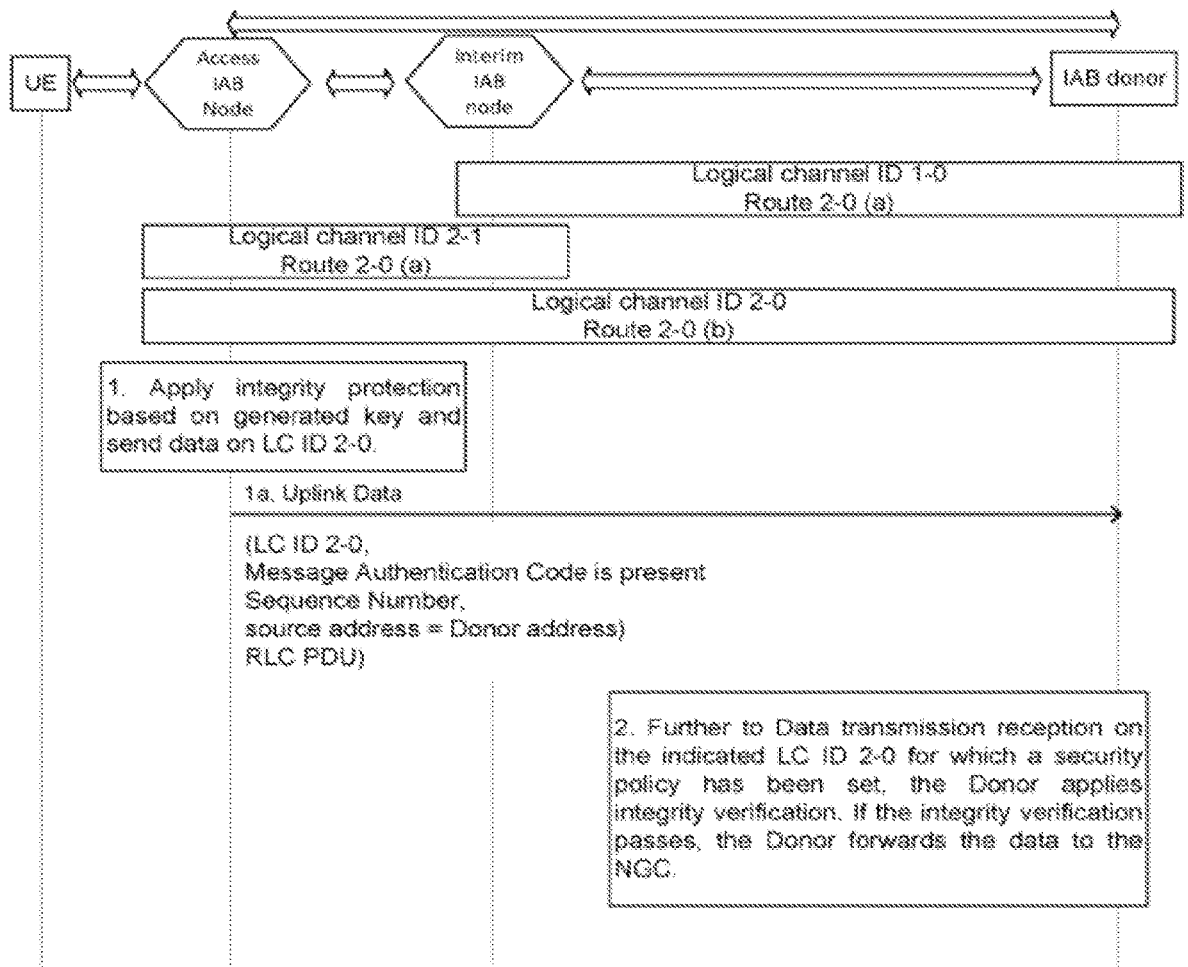
FIG. 8 shows a method of uplink integrity protection in an IAB network based on logical channels.

FIG. 8 shows a method of applying integrity protection to uplink data transmission from the Access IAB Node to the IAB Donor Node. The method applies the same techniques and principles described in relation to FIG. 7, but in the uplink direction. As shown in FIG. 8 the uplink uses a single logical link LCID 2-0 (however this is an example only and the uplink could use the reverse of the downlink). Integrity Protection is applied to LCID 2-0 from the Access IAB Node to the IAB Donor Node, rather than to each individual hop.

Figure 9:
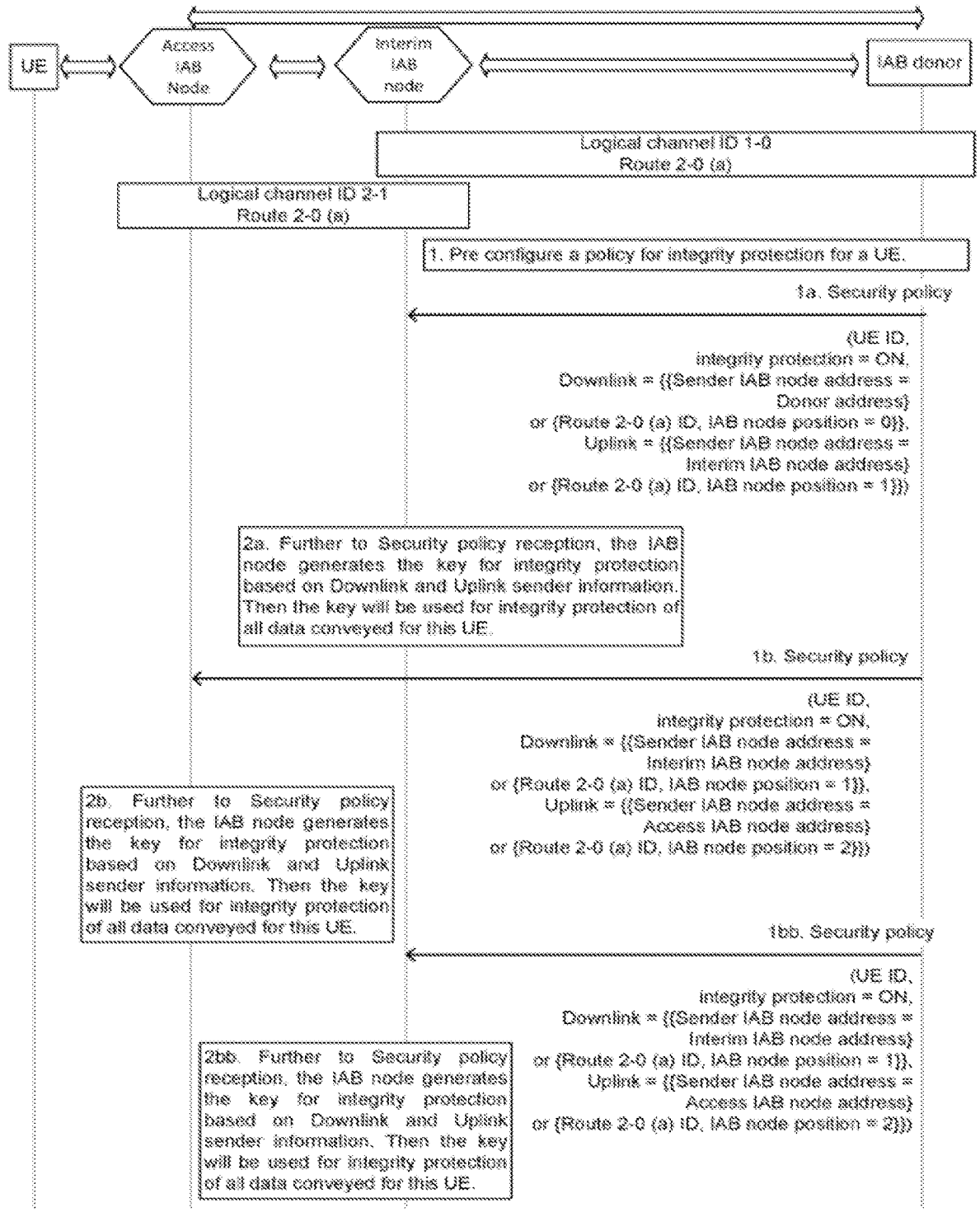
FIG. 9 shows a method of distributing a security configuration based on UE identity in an IAB network.

FIG. 9 shows a method for configuring integrity protection in an IAB network based on UE ID. The same techniques and methods described in relation to FIG. 6 are utilised, but the parameters are based on UE ID, rather than LC ID.

Figure 10:
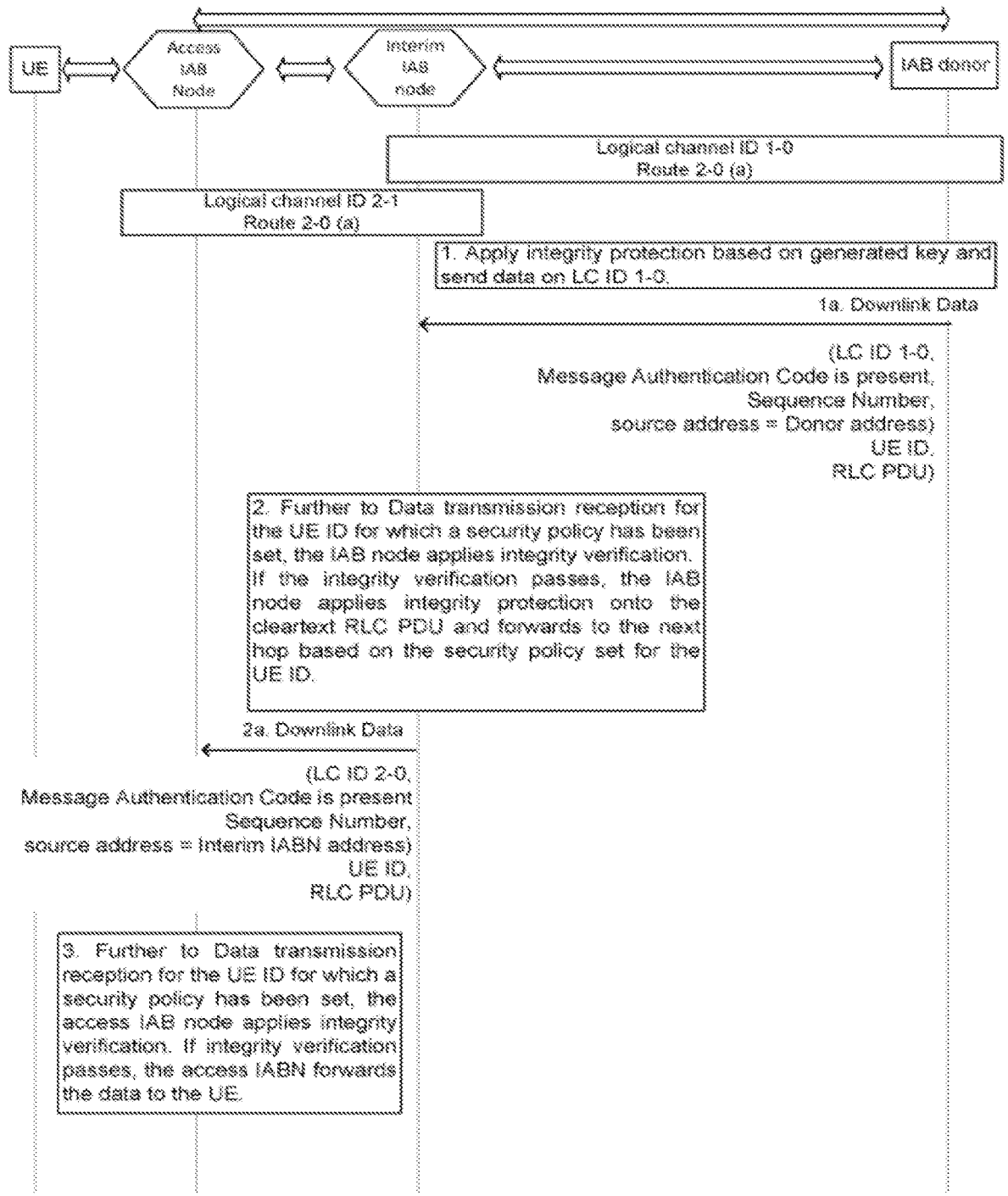
FIG. 10 shows a method of downlink integrity protection in an IAB network based on UE identity.

FIG. 10 shows a process of downlink data integrity protection based on UE ID. The method is the same as that described for FIG. 7, except the configuration applied in the method of FIG. 6 and the relevant parameters based on UE ID are utilised. Uplink data transfer protection may be achieved in the same manner as described in relation to FIG. 8, but using the relevant parameters based on UE ID.

Figure 11:
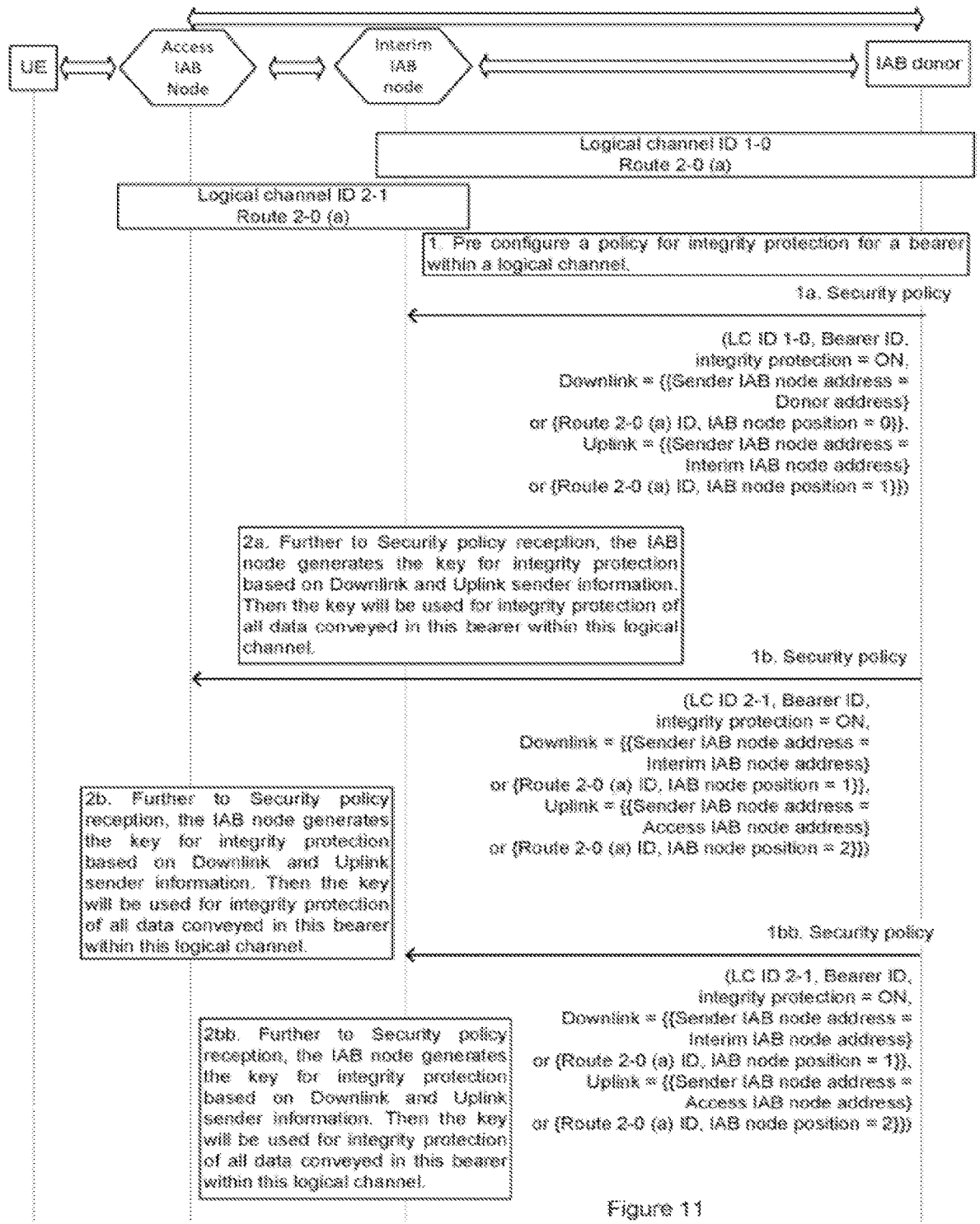
FIG. 11 shows a method of distributing a security configuration based on Bearer Identity in an IAB network.

FIG. 11 shows a method comparable to that of FIG. 6 for distributing a security policy, but based on Bearer ID. All of the above description applies equally to this method, but with appropriate parameters for Bearer ID utilised in place of those for the other methods. In this case both Bearer ID and LC ID are utilised as parameters because multiple bearers can be carried by one LC ID. This example therefore offers a finer granularity of security policy within one Logical Channel.

Figure 12:
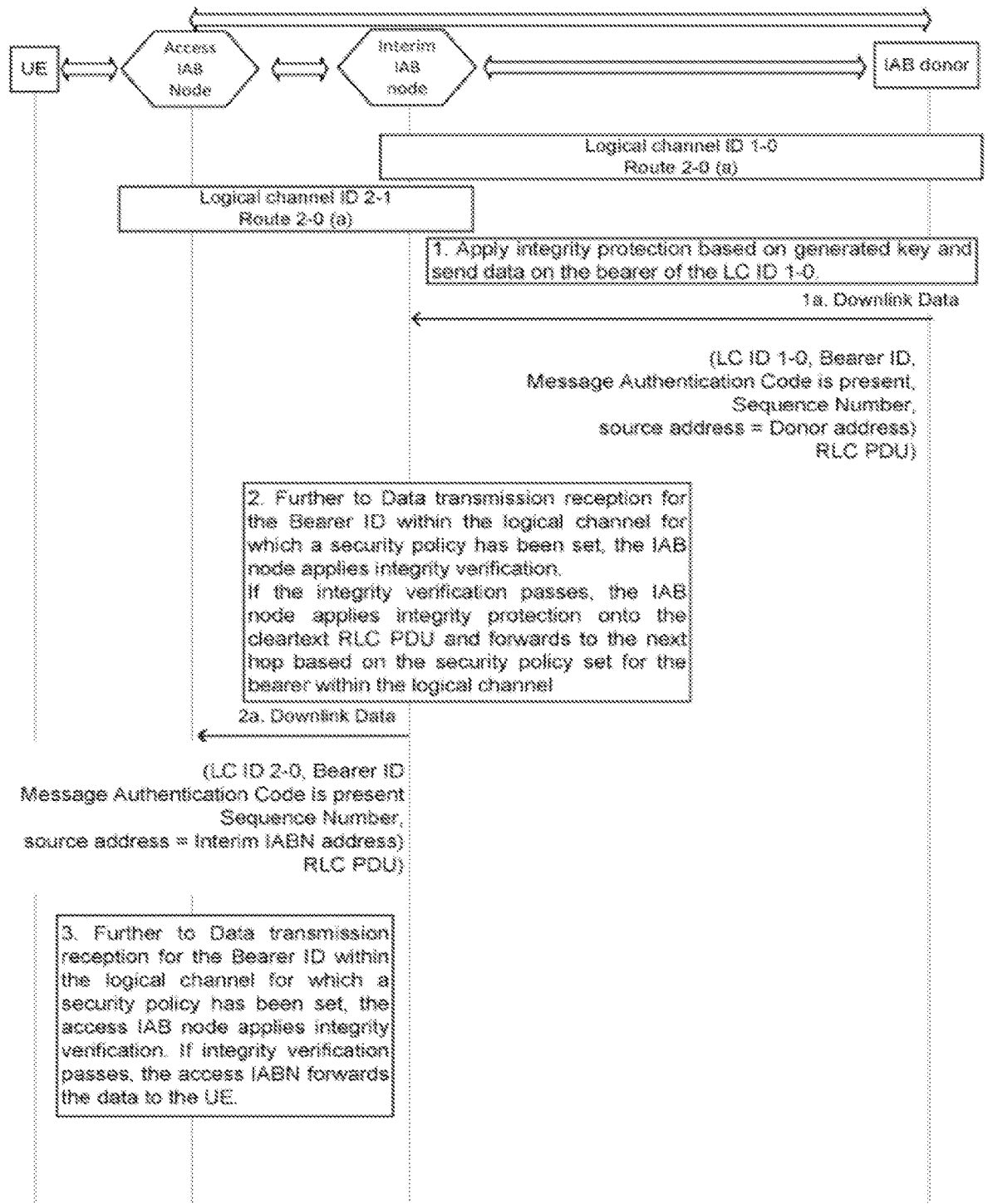
FIG. 12 shows a method of downlink integrity protection in an IAB network based on Bearer Identity.

FIG. 12 shows a method of downlink data transmission equivalent to FIG. 7, but utilising Bearer ID based on a configuration as applied in the method of FIG. 11. Uplink data transfer is protected in the same manner as described hereinbefore, but using the relevant parameters for Bearer ID.

The methods described hereinbefore therefore provide a mechanism to define and apply integrity protection within an IAB network. The integrity protection is applied at a layer below the IP layer enabling efficient implementation between IAB nodes in a network. The integrity protection enables tampered data to be identified and discarded at an early stage in transmission through the network, thus avoiding the waste of network resources to transmit invalid data.

There is therefore provided a method of distributing an integrity protection configuration in IAB comprising the steps of transmitting from an IAB Donor Node configuration information to nodes of the IAB network, the information including parameters to apply integrity protection to transmissions from each donor node and to apply integrity verification to data received from other IAB notes, the integrity protection and verification being at a layer below the IP layer. The configuration may be based on UE ID, Logical Chanel ID, or Bearer ID.

There is also provided a method of transmitting data in an IAB network, the method comprising the steps of, at a first IAB node, applying integrity protection to data for transmission to another IAB node in an IAB network, the integrity protection being applied at a layer below the IP layer. At the receiving IAB node an integrity verification check is performed on the received data. The integrity protection may be applied based on the UE ID, Logical Channel ID, or Bearer ID. The integrity protection may be applied based on a protocol ID.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of distributing an integrity protection and verification configuration in an integrated access backhaul (IAB) network, the method comprising the step of: transmitting an integrity protection and verification configuration from an IAB Donor Node of the IAB network to at least one other node of the IAB network, wherein the integrity protection and verification configuration includes configuration parameters for integrity protection and verification of traffic between IAB nodes of the IAB network to which the integrity protection and verification configuration is transmitted, the integrity protection and verification of the traffic between the IAB nodes is at a layer below an Internet Protocol (IP) layer.

2. The method of claim 1, wherein the configuration parameters include identifiers to apply integrity protection which are transmitted from the IAB donor node to each IAB node of the IAB network which needs to apply integrity protection.

3. The method of claim 1, wherein the configuration parameters include at least one of protocol data unit (PDU) sequence number, logical channel identifier, bearer identity, user equipment (UE) identity, key, direction, PDU, sender IAB node address, route identifier, and IAB node position.

4. The method of claim 1, wherein the configuration parameters are used to generate a key to apply integrity protection, or to verify integrity protection.

5. The method of claim 1 wherein the traffic is user traffic or signaling traffic.

6. The method of claim 5, wherein the integrity protection and verification configuration is for applying to user traffic or signaling traffic.

7. A method of configuring an integrated access backhaul (IAB) network for data transmission, the method comprising the steps of: at a donor node of the TAB network, generating a security configuration for a transmission route between the donor node and an access TAB node, wherein the security configuration is for integrity protection of each link forming the transmission route at a layer below the an Internet Protocol (IP) layer, and transmitting relevant parameters of the security configuration to TAB nodes forming the transmission route to enable each TAB node to apply integrity protection on data transmitted by the IAB node, or to verify integrity protection on traffic received by the IAB node, wherein each TAB node forming the transmission route is configured to discard any received traffic which fails integrity verification.

8. The method according to claim 7, wherein the security configuration includes at least one of protocol data unit (PDU) sequence number, logical channel identifier, bearer identity, user equipment (UE) identity, key, direction, PDU, sender IAB node address, route identifier, and IAB node position.

9. The method according to claim 7, wherein the security configuration is transmitted to all IAB nodes forming the transmission route, or all IAB nodes in the IAB network.

10. The method of claim 7, wherein the integrity protection and verification configuration is for applying to user traffic or signaling traffic.

11. A method of data transmission in an integrated access backhaul (IAB) network, the method comprising the steps of: at a first IAB node, applying integrity protection in accordance with a security configuration at a layer below an Internet Protocol (IP) layer to traffic to be transmitted on a first link of a transmission route through the IAB network; transmitting the integrity-protected traffic over the first link to a second IAB node; receiving traffic at the second IAB node and verifying the integrity protection of the traffic; and if the integrity protection fails verification, discarding the traffic.

12. The method according to claim 11, wherein the security configuration includes at least one of protocol data unit (PDU) sequence number, logical channel identifier, bearer identity, user equipment (UE) identity, key, direction, PDU, sender IAB node address, route identifier, and IAB node position.

13. The method according to claim 11, wherein the security configuration is transmitted to all IAB nodes forming the transmission route or all IAB nodes in the IAB network.

14. The method of claim 11, wherein the traffic is user traffic or signaling traffic.

15. A method of data transmission in an integrated access backhaul (IAB) network, the method comprising the steps of: at an interim IAB node, receiving traffic from a first IAB node; verifying integrity protection of the traffic according to a security configuration; if the verification fails, discarding the traffic; and if the verification passes, applying integrity protection at a layer below an Internet Protocol (IP) layer and transmitting the traffic to a second IAB node.

16. The method according to claim 15, wherein the security configuration is for uplink or downlink transmission between nodes of the transmission route.

17. The method according to claim 15, wherein the security configuration is defined per logical channel, per user equipment (UE), or per bearer.

18. The method according to claim 15, wherein the security configuration includes at least one of protocol data unit (PDU) sequence number, logical channel identifier, bearer identity, UE identity, key, direction, PDU, sender IAB node address, route identifier, and IAB node position.

19. The method according to claim 15, wherein the security configuration is used to generate a key to apply the integrity protection, or to verify the integrity protection.

20. The method according to claim 15, wherein a Message Authentication Code is included with transmitted data after applying integrity protection, and optionally integrity verification is performed based on MAC.

21. The method according to claim 15, wherein the security configuration is transmitted to all IAB nodes forming a transmission route, or to all IAB nodes in the IAB network.

* * * * *